(12) United States Patent
Deshpande et al.

(10) Patent No.: US 9,886,711 B2
(45) Date of Patent: Feb. 6, 2018

(54) PRODUCT RECOMMENDATIONS OVER MULTIPLE STORES

(71) Applicant: International Business Machines Corporation, Armonk, NY (US)

(72) Inventors: Prasad M. Deshpande, Bangalore (IN); Atreyee Dey, Bangalore (IN); Salil Joshi, Pune (IN); Songhua Xing, Staten Island, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 14/499,296

(22) Filed: Sep. 29, 2014

(65) Prior Publication Data
US 2016/0092960 A1   Mar. 31, 2016

(51) Int. Cl.
G06Q 30/00 (2012.01)
G06Q 30/06 (2012.01)

(52) U.S. Cl.
CPC ..... G06Q 30/0631 (2013.01); G06Q 30/0625 (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 7,418,447 B2 * | 8/2008 | Caldwell ............... G06Q 30/02 705/26.1 |
| 2002/0013735 A1 | 1/2002 | Arora et al. |
| 2013/0311340 A1 * | 11/2013 | Krishnan ........... G06Q 30/0643 705/27.2 |

FOREIGN PATENT DOCUMENTS

WO   2013009453 A1   1/2013

OTHER PUBLICATIONS

The Find, "About Us—TheFind.com," Shopping Search Reinvented, 2014, p. 1-3, TheFind, Inc., http://www.thefind.com/main/AboutUs.fhtml, Accessed on: Sep. 18, 2014.
(Continued)

*Primary Examiner* — Ethan D Civan
(74) *Attorney, Agent, or Firm* — L. Jeffrey Kelly

(57) ABSTRACT

Embodiments of the present invention disclose a method, computer program product, and system for identifying matching products relative to a reference product. A reference product is identified from a received product query and a query is generated based on the reference product. A generated query comprises of an ontology, at least one word appearing in a title of the reference product, and a set of key words appearing in social media data associated with the reference product. A database is searched using the generated query to find matching product sets and the results are returned and filtered. Results are filtered by calculating a relationship score between the reference product and one or more matching products in the set of matching products, and/or by filtering a subset of the set of matching products based on a customer profile. The filtered subset of results are communicated to a recipient.

17 Claims, 7 Drawing Sheets

(56) References Cited

OTHER PUBLICATIONS

Kannan et al., "Matching Unstructured Product Offers to Structured Product Specifications," KDD '11, Aug. 21-24, 2011, ACM, San Diego, California.

Lasek et al., "Semantic Information Filtering—Beyond Collaborative Filtering," 2011, Czech Technical University, Prague, Czech Republic.

Mell et al., "The NIST Definition of Cloud Computing," National Institute of Standards and Technology, Information Technology Laboratory, Oct. 7, 2009, Version 15.

* cited by examiner

PRODUCT RECOMMENDATIONS OVER MULTIPLE STORES

BACKGROUND OF THE INVENTION

Embodiments of the present invention generally relate to online shopping, and more particularly to the use of search queries to define product attributes in electronic commerce (ecommerce) platforms.

A typical online shopping experience may involve a consumer conducting various searches on manufacturer or retailer web sites to identify products of interest. If the consumer's search terms match the information used in a particular product description, then that product might be included in the search results presented to the consumer. Because the product descriptions may often be generated, however, by the manufacturer or retailer, there may be instances in which consumer expectations are not fully captured in the information being provided. Accordingly, improvements may be achieved with regard to providing consumers an accurate and fast mechanism to identify products of interest.

Modern databases may contain a large number of tables storing an extensive amount of data. These databases may contain an equally large number of reference tables for storing reference data characterizing the other data in the database. Although two databases may contain equivalent data, the databases may contain different reference data. The reference data contained may be structured, unstructured, different sizes, or may have features with no predefined pattern.

In relation to ecommerce, a query for a product in one store may return different results from the same query in another store due to differences in reference data associated with that product.

The retrieval of accurate information and subsequent delivery of semantically similar objects to the user system may be a goal of search and/or knowledge management systems in a computing environment. The ability to scale searches well, in light of the number of objects and comparisons may be a goal for approaching the retrieval of semantically similar objects. Accordingly, it is desirable to provide techniques to improve the accuracy of semantic matching methods that scales well in a computing environment.

SUMMARY

Embodiments of the present invention disclose a method, computer program product, and system for identifying matching products relative to a reference product. A reference product is identified from a received product query, and a query phrase is generated based on the identified reference product. A query phrase comprises of an ontology of the reference product, at least one term appearing in the title of the reference product, and a set of terms appearing in the data associated with the reference product. A database is searched using the query phrase to find a set of products with matching terms, or "matching products". Results are returned based on the set of matching products, and filtered by calculating a relationship score between the reference product and one or more matching products. Further filtering may be through a subset of the set of matching products based on a generated profile associated with a user identification. The filtered subset of results are stored or communicated.

DETAILED DESCRIPTION

Figure 1:
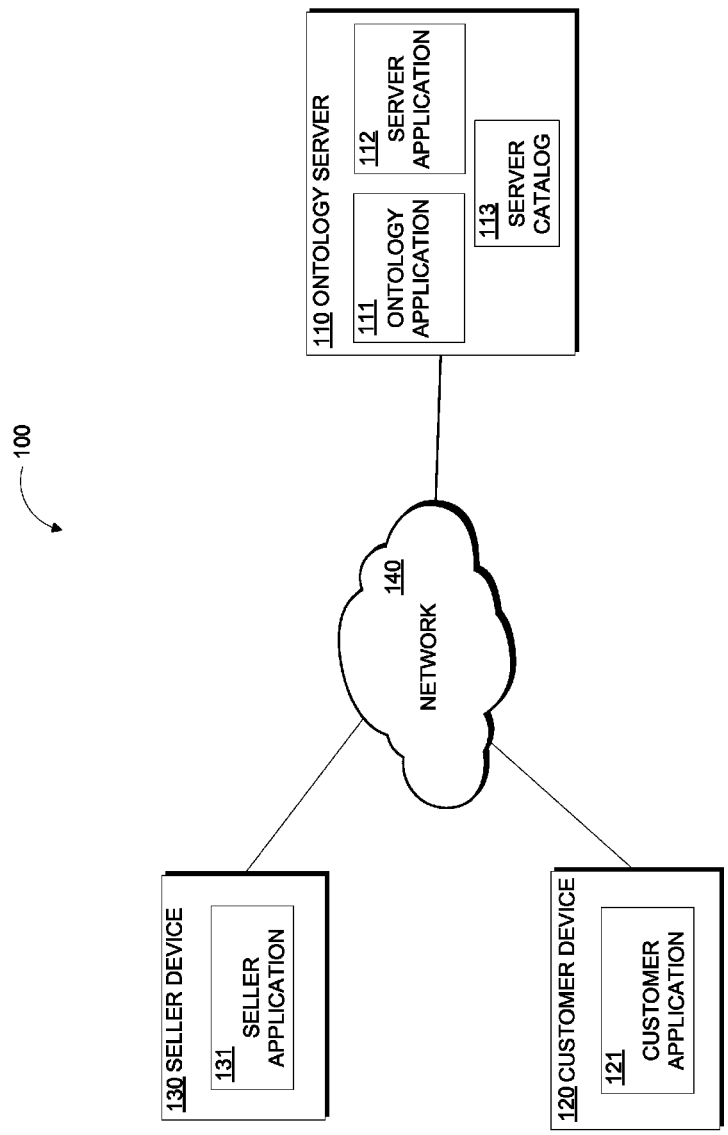
FIG. 1 is a functional block diagram illustrating a distributed data processing environment, in accordance with an embodiment of the present invention.

The present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An ecommerce store owner may find it important to be able to provide relevant product recommendations not only based on in store product data but from data across many stores and social media. When dealing across different stores, making recommendations can be difficult due to, for example, equivalent or similar products having different brand names, highlighted features, category organization, or exclusive product lines.

Embodiments of the invention may recommend products in response to an incoming query to an application on a server, or "product query". Results of the product query may be formulated by analyzing a "reference product". A reference product is identified based on a product title or product description provided in the product query, and one or more relationship scores between the identified reference product and other products. A reference product may be identified based on, for example, a specific product title or description received from a client, a product selected from a list, or a relationship graph. The relationship score may be based on various product characteristics, elements, or "facets", contained in, for example, the product ontology, product description, product title, product reviews, social media posts about the product, price, brand, location, or customer purchase history. The facets may be determined based on structured and unstructured data associated with the product. Results provided in response to a product query may include the top scoring products, identified as "matching products", where the scoring is based on facets of a potential matching product and the facets of the reference product, where the greater the number of matching facets the greater the score may be. Matching products may be further filtered after scoring based on profiles associated with a client.

Embodiments of the present invention will now be described in detail with reference to the Figures. FIG. 1 is a functional block diagram illustrating a distributed data processing environment, generally designated 100, in accordance with an embodiment of the present invention.

Distributed data processing environment 100 includes ontology server 110, seller device 130, and customer device 120, all interconnected over network 140.

Network 140 may include permanent connections, such as wire or fiber optic cables, or temporary connections made through telephone or wireless communications. Network 140 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 140 may also include a number of different types of networks, such as, for example, an intranet, a local area network (LAN), or a wide area network (WAN).

Each of ontology server 110, seller device 130, and customer device 120 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 7 below.

Ontology server 110 includes ontology application 111, server application 112, and server catalog 113, as described in greater detail below, with reference to FIG. 2. In various embodiments of the invention, ontology server 110 operates generally to receive product data from client devices, for example, seller device 130 or customer device 120, and to host applications, for example, ontology application 111 or server application 112, which may process and store the product data in server catalog 113.

Ontology application 111 may be, for example, database oriented, computation oriented, or a combination of these. Ontology application 111 may operate generally to receive and process one or more different ontologies. Ontologies may be for example, data labels or textual representations, for example, product hierarchies of class, type, or definition. Ontology application 111 may receive one or more ontologies that may be aligned or merged, and may receive natural language documentation about products associated with the ontologies, or product descriptions, that may be stored and indexed.

In various embodiments of the invention, server application 112, which may be part of or separate from ontology application 111, may be, for example, database oriented, computation oriented, or a combination of these. Server application 112 may operate generally to receive and process product queries from, for example, seller device 130, or customer device 120. Server application 112 may receive product queries and may, based on the received product query, identify a reference product. Server application 112 may identify a reference product based on a received product query that includes a product title and/or description. Server application 112 may identify a reference product and search for equivalent products, as described below. Server application 112 may search the product catalog data, processed and stored by ontology application 111 in server catalog 113, to find and return results in response to the product query. The results to the product query may be based on potentially relevant products in the products data that share characteristics, or facets, with the reference product. Server application 112 may assign scores to the potentially relevant products. Products that have a high degree of equivalency with the reference product may receive a high score. Server application 112 may return highly scored equivalent products as results to a product query. Server application 112 may apply filters to returned results. A user device, for example, seller device 130 or customer device 120, may subscribe to server application 112 and create a "user profile", as described below, that may be used in a results filtering process. A user profile may be used to predetermine dynamic filters that may be applied to returned results. If there is a profile associated with a user, for example, seller device 130 or customer device 120, server application 112 may filter results before communicating the results to a user.

In various embodiments of the invention, a server catalog 113, which may be separate from ontology application 111 and server application 112, may be a data store that receives the merged and indexed data from ontology application 111. Data from ontology application 111 or server application 112, as well as, merged and/or indexed information about various products or product catalogs, may be stored in server catalog 113. The product catalog may include, for example, product titles, category or ontology descriptions, product descriptions, price, color, or any characteristic of a product. Server catalog 113 may be stored in a database or data store in memory, for example, on ontology server 110 or in a separate or external memory. Data in server catalog 113 may include, for example, an index that may contain a list of client device, for example, seller device 130, IDs and associated catalogs received from those clients. Server application 112 may pull product information contained in server catalog 113 in response to a product query received by, for example, seller device 130 or customer device 120, as described below. Although server catalog 113 is described herein as an application on ontology server 110, this is merely one embodiment. Server catalog 113 may be a separate server or series of servers, a database, or other data storage, internal or external to ontology server 110.

In an embodiment of the present invention, seller device 130 may operate generally to send and receive catalog data, reference product data, send product queries, send subscriptions, and receive data related to results from the product queries. Seller device 130 may host applications, for example seller application 131.

Seller application 131 may operate generally to send product queries, product catalogs, reference product information, subscription request, subscription information or other data, or receive query results, which seller application 131 may use for further processing. Seller device 130 may communicate with ontology server 110 through network 140. Seller application 131 may be an application for receiving input from a user, displaying data in a GUI, or communicating over a network, for example, a web browser. Seller application 131 may allow a user to input reference product information.

In an embodiment of the present invention, customer device 120 may operate generally to send and receive, reference product data, product queries, subscriptions, and receive data related to results from the product queries. Customer device 120 may host applications, for example customer application 121.

Customer application 121 may operate generally to send product queries, reference product information, subscription requests, subscription information or other data, or receive query results which customer application 121 may use for further processing. Customer device 120 may communicate with ontology server 110 through network 140. Customer application 121 may be an application for receiving input from a user, displaying data in a GUI, or communicating over a network, for example, a web browser. Customer application 121 may allow a user to input reference product information.

In an embodiment of the present invention, ontology application 111 may receive, from seller device 130, catalog C, which may contain ontology $O_1$ and $O_2$ and textual product data $P_C$. Ontology application 111 may merge $O_1$ and $O_2$, as described below, and generate $O_M$. Ontology application 111 may index $P_C$, as described below, and generate $P_I$. Ontology application 111 may store $O_M$ and $P_I$ in server catalog 113. Server application 112 may receive a product query from, for example, seller device 130 requesting equivalent products to the reference product. Server application 112 may generate a compound query, or "application query", in response to receiving a product query, as described in more detail below. Server application 112 may use an application query to search the server catalog 113 and pull results from server catalog 113 to send to seller device 130.

For example, ontology application 111 may receive a catalog of kitchen appliances from seller device 130. The catalog (C) may include an ontology of coffee makers from Retailer 1 ($O_1$) and Retailer 2 ($O_2$). C may contain product information about various coffee makers from Retailer 1 and Retailer 2 ($P_C$). $O_1$ may contain a category named "coffee pots" and $O_2$ may contain a category named "coffee brewers". Ontology application 111 may merge $O_1$ and $O_2$ and generate $O_M$, where, "coffee pots" and "coffee brewers" are all equated to "coffee maker".

Figure 2:
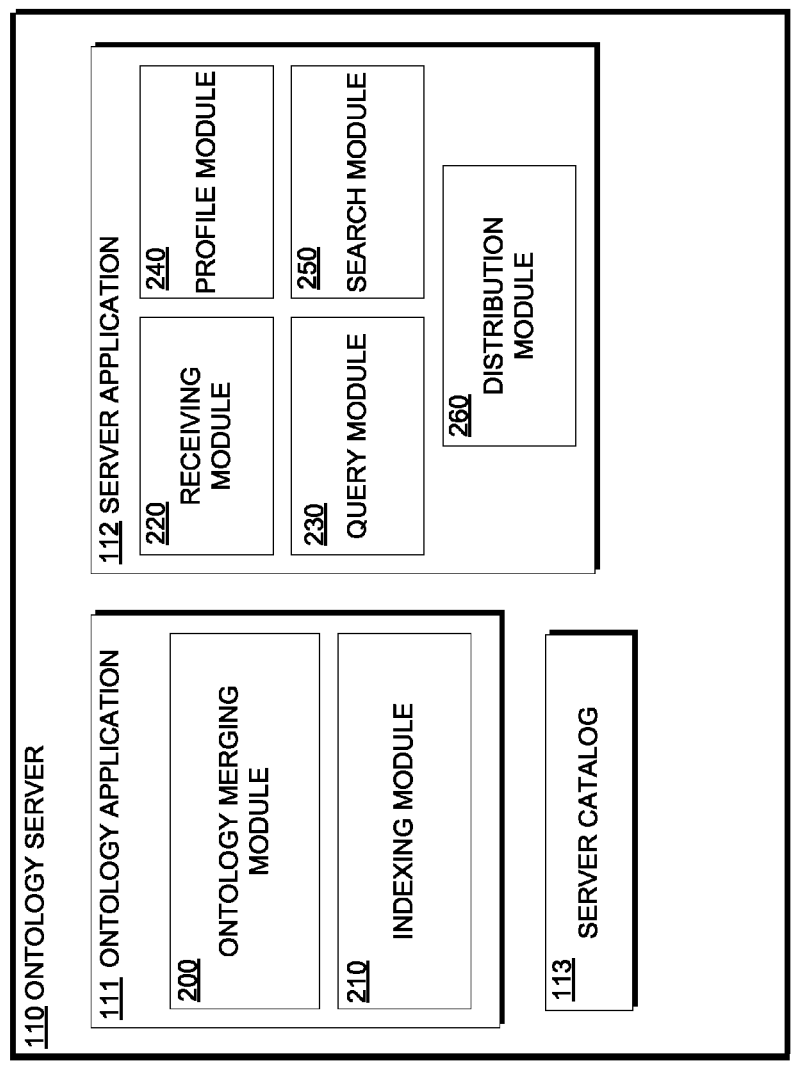
FIG. 2 is a functional block diagram illustrating components of a server of FIG. 1, in accordance with an embodiment of the present invention.

FIG. 2 is a functional block diagram illustrating the components of ontology server 110, including components of ontology application 111 and server application 112, and server catalog 113, in accordance with an embodiment of the present invention. Ontology application 111 may receive different ontologies from one or more sources (e.g., from seller device 130) that it may merge, as described above, and may receive natural language documentation about products that may be indexed, as described below. Ontology application 111 includes ontology merging module 200 and indexing module 210.

In an exemplary embodiment of the invention, ontology merging module 200 may receive data, in the form of, one or more catalogs from one or more clients, for example, seller device 130. The data may include, for example, product ontologies from various sources or stores. Ontology merging module 200 may check the received data to determine if the data has been previously processed. The catalog data may separate the ontologies and product textual data so that an application query may be generated. Ontology merging module 200 may utilize ontology merging systems where, for example, ontology merging module 200 may receive an initial ontology, $O_1$, and may use $O_1$ as the standard ontology. Ontology merging module 200 may receive additional ontologies, $O_2$, $O_3$, . . . , $O_N$, and may define different relationships among the terms of each ontology and align the terms of each ontology with terms of $O_1$ into a single ontology database, $O_M$. Ontology merging module 200 may create $O_M$ via, for example, matching and mapping techniques, for example, DSSim, X-SOM, or ABSURDIST systems. Ontology merging module 200 may store the aligned ontology in server catalog 113 and ontology merging module 200 may pass the product textual data to indexing module 210. All brand names and/or trademarks used herein are the property of their respective owners.

Indexing module 210 may generally search and index data, stored in, for example, HTML documents, word processor documents, PDF files, or any document where textual data can be extracted. Indexing module 210 may receive textual data from seller device 130, for example, through ontology merging module 200. This product textual data may include documents related to the reference product, for example, an electronic product descriptions, product reviews, product user comments, or social media references. Social media reference may include status updates, posts, tweets, hashtags, comments, or ratings record (e.g. a number, letter, or star score scale, a thumbs up, emoticon, or other indication of preference). Indexing module 210 may index the extracted textual data and store the indexed data in server catalog 113.

In various embodiments of the invention, indexing module 210 may receive textual data from social media websites and index the textual data, at predetermined intervals, using data mining tools such as IBM Social Media Analytics, IBM SPSS Modeler, Tweettracker or FBStalker. Indexing module 210 may receive social media login information via profile module 240, described below, and search and extract, for example, timestamps, geographical locations, message text, comments on messages, hashtags, urls, other users IDs mentioned in messages, comments, or reviews, or replies associated with the login information received by indexing module 210. Indexing module 210 may query server application 112 for the identified reference product. Indexing module 210 may search and index mined textual data from the social media source, add the social media textual data to the stored indexed product textual data on server catalog 113, pass the indexed social media textual data to profile module 240 described below, or pass the indexed social media textual data to a data store in memory or other module for further processing. Indexing module 210 may associate any relevant indexed social media textual data with a respective reference product and may pass the indexed social media textual data associated with a reference product to query module 230, server catalog 113, or other module for further processing. All brand names and/or trademarks used herein are the property of their respective owners.

For example, indexing module 210 may receive login information for "Social Site X" from customer device 120 via profile module 240, with user ID "Customer". Indexing module 210 may search a predetermined time span on Social Site X, for example, posts for the past two weeks by Customer, for any textual data related to a reference product, for example, Mr. Coffee BVMC-SJX33GT Programmable Coffeemaker, and the reference products ontology. Customer's post history may include references to various products for example, a post on Social Site X may include a review for a "Kurig Coffee Maker". Indexing module 210 may search and index the entire social media post and query server application 112 to determine if any indexed facets are in the same ontology as the reference product. Indexing module 210 may search and index several facets for example "Kurig Coffee Maker". The post may also contain "12-Cup", which may also be in the same ontology as the reference product. Other words that are not in the ontology may not be passed to server application 112. Indexing module 210 may pass, for example, "12-Cup AND Kurig Coffee Maker" to server application 112. Indexing module 210 may store "12-Cup AND Kurig Coffee Maker" as social media textual data associated with Mr. Coffee BVMC-SJX33GT Programmable Coffeemaker or store "12-Cup AND Kurig Coffee Maker" as a phrase associated with Customer's login information in a profile associated with Customer, described below.

Indexing module 210 may index textual data by performing a text analysis where the analysis may convert the textual data into a fundamental units of searching, which may be called, for example, "text facets". During analysis, the textual data may undergo multiple operations, for example, extracting the words, removing common words, ignoring punctuation, reducing words to root form, or changing words to lowercase. After the text analysis is complete, indexing module 210 may add text facets to a product index. Indexing module 210 may store indexed product textual data on server catalog 113 or pass the indexed product textual data to a data store in memory.

In an exemplary embodiment, server application 112 may receive product queries, (including, for example, a product title and/or a product description) based on which, server application 112 identifies a reference product. The product query may include a request for similar products. Server application 112 includes receiving module 220, query module 230, profile module 240, search module 250, and distribution module 260.

Receiving module 220 may receive a product query from, for example, seller device 130 or customer device 120, via, for example, network 140. Receiving module 220 may, for example, perform one or more query verification functions to determine that the request information is in the correct format. Product queries may be stored as entries into a data store or queue that may be, for example, a FIFO queue, LIFO queue, circular queue, or any other data structure. A product query may be received from seller device 130, for example, a general search query for "12 cup coffee maker". Receiving module 220 may query server catalog 113 and identify a reference product contained in server catalog 113 to associate with the product query, for example, Mr. Coffee BVMC-SJX33GT Programmable Coffeemaker. Receiving module 220 may communicate the product query and/or identified reference product to query module 230.

Query module 230 may act generally to receive product queries from receiving module 220, parse out the elements of the product query, and generate a compound query, or "application query". Query module 230 may pass an application query to search module 250 for processing. Query module 230 may pull product queries from the product query queue in receiving module 220 or query module 230 may receive a product query passed from receiving module 220. The product query may contain one or more terms for example, a selection of a reference product, a description of a product, an ontology, or category that contains a desired product. Query module 230 may parse, or separate, the elements of the product query. Elements of the product query may be for example, words or phrases in the reference product title, reference product description, or product description received from, for example, seller device 130 or customer device 120. Query module 230 may index elements of a product query and may generate an application query.

Query module 230 may generate an application query with, for example, a first search term that is based on a predefined ontology of a product, as well as, a second term that may be based on a fuzzy search of the words or elements of the reference product title, and a third term or "boost phrases". A boost phrase may be one or more words that occur in the indexed textual data, or indexed social media data, for example, textual facets indexed from an electronic comment associated with the reference product, an electronic review record of the reference product, an electronic rating record of the reference product, an electronic description record of the reference product, or a social media posting associated with the reference product.

In various embodiments, a boost phrase may be indexed social media textual data associated with the reference product received from indexing module 210, profile module 240, or pulled from server catalog 113. Query module 230 may receive boost phrases from indexing module 210, for example, "12-Cup AND Kurig Coffee Maker". Query module 230 may receive an identified reference product from receiving module 220, for example, "Mr. Coffee BVMC-SJX33GT Programmable Coffeemaker". The identified reference product may have associated indexed social media boost phrases in memory, for example, in an entry in server catalog 113. In various embodiments, "12-Cup AND Kurig Coffee Marker", the boost phrase associated with the reference product, "Mr. Coffee BVMC-SJX33GT Programmable Coffeemaker" may be associated with a profile stored in memory in profile module 240 and Query module 230 may pull the boost phrase from profile module 240. Query module 230 may use the boost phrase as a term in the application query.

A fuzzy search may be performed with fuzzy search terms that may include each individual word from the reference product title and/or boost phrase. A fuzzy search term may be used to aid in the effectiveness of the product search as a fuzzy search returns results based on likely relevance and not exact word matches. Fuzzy searches may be advantageous as elements with alternative spellings or misspellings may still result in relevant search results. For example, if "planet" is entered as an element, results may include products containing words such as "protoplanet" or "planetary." The fuzzy search may also return synonyms and related terms, working like a thesaurus or encyclopedic cross-reference tool. Query module 230 may pass the application query to search module 250.

For example, query module 230 may receive a query, with an identified reference product, from receiving module 220. The product query may be, for example, "a 12 cup coffee maker", and the identified reference product may be, for example, "Mr. Coffee BVMC-SJX33GT Programmable Coffeemaker". The identified reference product may have an associated product description in server catalog 113. Query module 230 may generate an application query with a first term containing the merged ontology of the reference product, for example, "Ontology: (Kitchen & Dining\Coffee, Tea & Espresso\Drip Coffee Machines\)", and a second term containing a fuzzy search of the words in the title of the reference product or a boosted phrase, for example, "Title: 'Mr.' OR 'Coffee' OR 'BVMC-SJX33GT' OR 'Programmable' OR 'Coffeemaker" AND "Boost Phrase: 'Mr. AND Coffee AND Programmable AND Coffeemaker' OR '12-Cup AND Kurig AND Coffee AND Maker' where the boost phrase may result from indexed textual data or associated indexed social media textual data. The application query may be communicated to search module 250. The boost phrase term of the application query may change as the associated social media textual data is updated at a predetermined interval.

Search module 250 may operate generally to search the server catalog 113 in order to find matching products that satisfy the application query generated in response to the received product query. Search module 250 may receive an application query from query module 230. Search module 250 may search server catalog 113 to find products in server catalog 113 that include the title words and description phrases of the reference product. Search module 250 may apply a score to products that have matching attributes or facets in relation to the reference product where, for example, the more matching facets, the higher the score of the matched product may be. Search module 250 may pass scored search results to profile module 240, or distribution module 260, as described below.

Profile module 240 may act generally to receive subscription information from a device, for example, seller device 130 or customer device 120, create a user profile, and filter scored results, received by search module 250, by applying product result preferences, social media data, search history, or other filter preferences stored in the user profile. In various embodiments, profile module 240 may associate indexed social media textual data with a profile. A user, during subscription, described below, may include the social media login information used when performing the product query, or the user may provide the social media login information during subscription before a product query is submitted.

In an embodiment of the present invention, a client device, for example, customer device 120, may subscribe to server application 112. Subscription and profile generation may allow additional filtering, by profile module 240. Profile module 240 may receive profile information from customer device 120, generate a profile and/or user ID associated with customer device 120, and store the profile and associated ID in a list in a data store in memory. Profile module 240 may generate filtered results from an application query based on a generated profile or "profile filtered results". Profile filtered results related to an application query may be more relevant than results without a subscription or profile. Customer device 120 may receive user input that sends a subscription message to ontology server 110.

A subscription request may be received by profile module 240, via ontology server 110. If profile module 240 receives a subscription request, profile module 240 may send a "subscription message" to, for example, seller device 130 or customer device 120, indicating that profile module 240 requires, for example, a user ID, to identify the source of subscription request, to authenticate the user as legitimate, or make a payment, to subscribe. Identification requirements may be, for example, the use of a CAPTCHA, providing and confirming an email address, social media access information, user ID name and password, financial information for subscribing by payment, or any combination or method of verification in accordance with an embodiment of the invention.

If profile module 240 receives proper identification information, profile module 240 may subscribe the user by storing the received identification information to a data store, for example, in a list of subscribed user or "user profiles", in a data store in memory. This list may be stored in a data store, for example, in RAM(S) 704 or computer readable storage media 708 (FIG. 7). Profile module 240 may store additional information in a user profile, for example, search history of the user, previously received reference products, product queries and related application queries, terms from queries, social medial information, or any information that would relate to the user associated with the profile.

Profile module 240 may filter received scored results by, for example, changing the order of the scored results, to reflect product preferences in the user profile, for example, using social media to identify equivalent products that may be more relevant to the user, such that preferred products will be listed higher in the list. In various embodiments, profile module 240 may add to the score of preferred products, in order to reflect user profile, which would raise the score of certain result and may increase preferred products position in the list of scored results. Profile module 240 may pass the profile filtered results to distribution module 260.

In various embodiments, profile module 240 may filter results using the indexed social media textual data associated with the profile user ID or textual facets indexed from social media using the social media login information associated with the profile. For example, profile module 240 may receive search results from search module 250 and several of the results may, for example, contain "Kurig". Profile module 240 may have "Kurig" as a textual facet of indexed social media textual data associated with the user profile. In various embodiments, profile module 240 may present search results containing "Kurig" higher in the list of products, only show equivalent products containing "Kurig", add a predetermined amount to the score of results containing "Kurig", resort the search results list, communicate a greater number of results containing "Kurig" relative to results without "Kurig", or perform various other sorting or filtering of the search results before passing the list of search results to distribution module 260.

In an alternative embodiment, search module 250 may communicate scored results to distribution module 260 instead of, or in addition to, profile module 240. Distribution module 260 may act generally to store query results, organizing the results so that they can be displayed, and may send results to a client, for example, customer device 120. Distribution module 260 may receive scored search results resulting from the application query search performed by search module 250, from search module 250, or profile filtered results from profile module 240.

In various embodiments of the invention, distribution module 260 may determine if there are a sufficient number of results received from search module 250 or profile module 240. Distribution module 260 may have a predetermined threshold of results where, for example, distribution module 260 will only process results if the number of results is above the threshold. Distribution module 260 may select a top number of results to provide the most relevant products as an output. The most relevant products may be determined as the products with the highest relationship score. Distribution module 260 may select a predetermined number of results to process as output, for example, as a graphical display or store results in a data store in memory for further processing by ontology server 110.

In an embodiment of the distribution module 260 may organize top scoring results graphically via, for example, nodes and edges. The nodes, in the graph generated by distribution module 260, may represent, for example, the reference product and each matching product. There may be directed edges between two products that may represent, for example, a match between the reference product and a matching products. The length of the edge between two matching products may represent, for example, the score of the matching product. This nodal graphic representation is merely an example of a useful organization of the data and the data can be represented in many alternative ways. Distribution module 260 may send the graphical representation of the results to a display, for example, display screen 720 (FIG. 7), seller device 130, customer device 120, or to a cloud computing environment 500 (FIG. 5), in accordance with an embodiment of the invention.

Figure 3:
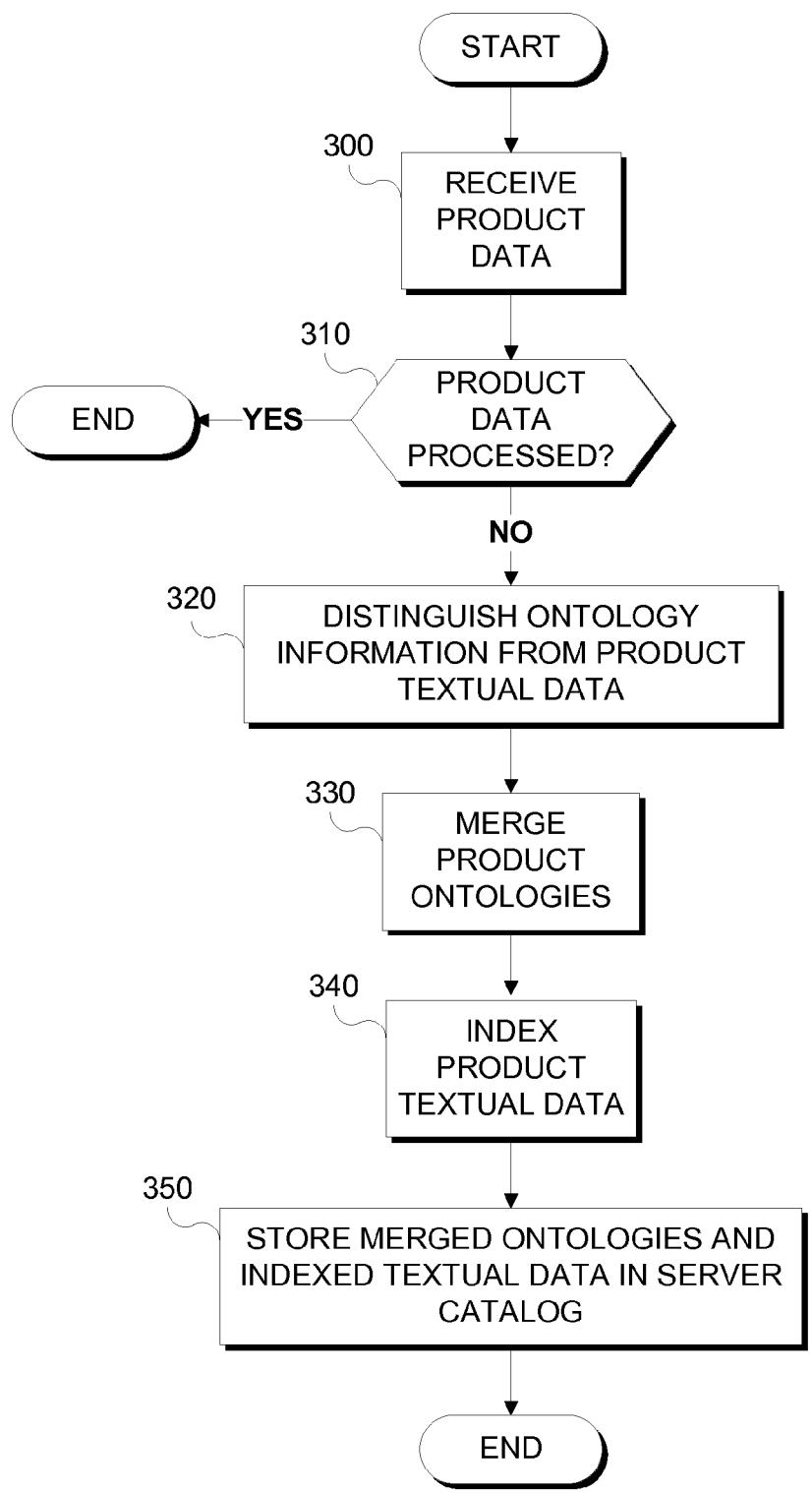
FIG. 3 is a flowchart depicting operational steps of an application receiving and merging data, in accordance with an embodiment of the present invention.

FIG. 3 is a flowchart depicting operational steps of an application processing received data, within the data processing environment of FIG. 1, in accordance with an embodiment of the present invention. Referring now to FIGS. 1, 2, and 3, ontology merging module 200 receives product catalog data from seller device 130 (step 300). The catalog may contain one or more ontologies and textual product data.

Ontology merging module 200 determines if the received product catalog has already been merged and indexed, or "processed" (decision step 310). If the product catalog has been processed (decision step 310 "YES" branch) the product catalog is stored in server catalog 113. If the data has not been processed (decision step 310 "NO" branch) ontologies and product textual data are indexed and distinguished to be processed by ontology merging module 200 and indexing module 210 (step 320).

Ontology merging module 200 merges ontology data by aligning ontologies $O_2, O_3, \ldots, O_N$ with a standard ontology $O_1$ (step 330). Ontology merging module 200 stores merged ontology data on server catalog 113 (step 350).

Indexing module 210 receives social media login information from the user or profile module 240 and searches and indexes the social media textual data (step 340). Indexing module 210 also indexes received product textual data the catalog received from ontology merging module 200 (step 340). Indexing module 210 indexes the social media textual data and received product textual data by performing a text analysis where the analysis may convert the text data into a fundamental units of searching, or text facets. During analysis, the textual data may undergo multiple operations, for example, extracting the words, removing common words, ignoring punctuation, reducing words to root form, changing words to lowercase, etc. Indexing module 210 stores the indexed product textual data on server catalog 113 (step 350).

Ontology merging (step 330) and indexing textual data (step 340) may occur in sequence as described, or in parallel after ontology merging module 200 receives a product catalog (step 300) that is not previously processed (decision step 310 "NO" branch). Storing merged ontology data and indexed product textual data passes on server catalog 113 (step 350) may occur in sequence or in parallel. Server catalog 113 stores received data in a data store in memory.

Figure 4:
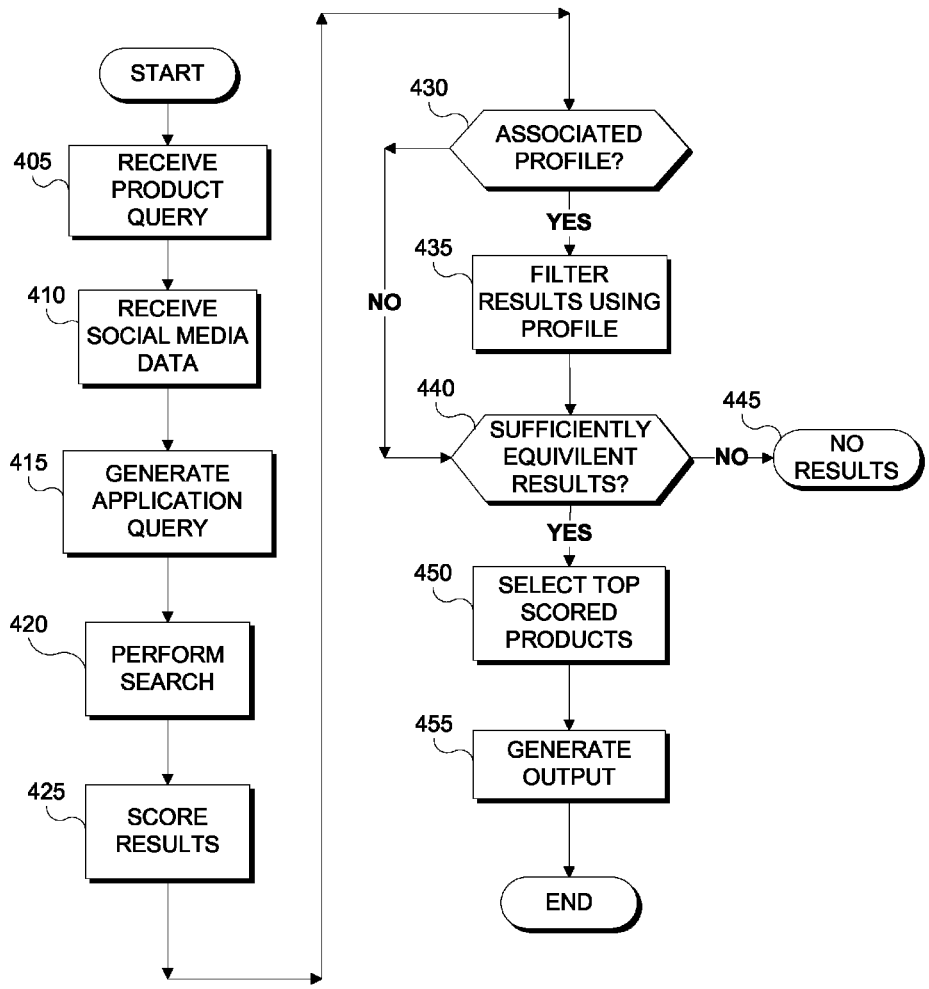
FIG. 4 is a flowchart depicting operational steps of receiving an application, receiving a query, and generating relevant product results for that query, in accordance with an embodiment of the present invention.

FIG. 4 is a flowchart depicting operational steps of receiving a product query and generating relevant results for that product query, within the data processing environment of FIG. 1, in accordance with an embodiment of the present invention. Referring now to FIGS. 1, 2, and 4, receiving module 220 receives a product query from seller device 130 or customer device 120 (step 405). A reference product is identified in response to the product query. A reference product can be received by receiving module 220 from seller device 130 or customer device 120, identified from a list, or selected from a set of graphically represented products, or identified by its title or description as contained in the product query.

Receiving module 220 passes the received product query and identified reference product to query module 230. Query module 230 receives indexed social media data from indexing module 210 or indexed social media data associated with the profile from profile module 240 (step 410). Query module 230 parses the title of the identified reference product, the ontology of the reference product, and the indexed social media data as terms in an application query and generates the application query (step 415). Query module 230 passes the application query to search module 250.

Search module 250 performs a search (step 420) by receiving an application query from query module 230, and performing a text search of the merged and indexed product data in server catalog 113. Search module 250 finds products in server catalog 113 that include the title words and description phrases of the reference product. Search module 250 applies a score to products (step 425) that have matching attributes, elements, or facets in relation to the reference product. Search module 250 compiles the results of the search in a list or file in memory.

Search module 250 queries the receiving module 220 to determine if the received product query has an associated profile or subscription (step 430). If there is a profile (decision step 430 "YES" branch) search module 250 passes the results of the application query to profile module 240 (step 435). If there is no profile (decision step 430 "NO" branch) search module 250 passes the results of the application query to distribution module 260.

If search module 250 passes the results of the application query to profile module 240 (decision step 430 "YES" branch), profile module 240 filters the received results by using information from the user profile, for example, indexed social media textual data associated with the profile, search history or purchase history stored in the profile, product queries and related application queries, terms from queries, social medial information, or any information that would relate to the user (step 435). After profile module 240 filters results, profile module 240 passes the filtered results to distribution module 260.

Distribution module 260 receives application query results from search module 250 (decision step 430 "NO" branch) or profile filtered results from profile module 240 (step 435). After receiving results, distribution module 260 determines if there are a sufficient number of results to process for output (step 440). The threshold for determining a sufficient number of results may be predetermined by a user or developer. If the number of results received by distribution module 260 are above the predetermined threshold (decision step 440 "YES" branch) distribution module 260 will process the results for output. If there the number of results received by distribution module 260 are not above the predetermined threshold (decision step 440 "NO" branch), distribution module 260 will return a message to seller device 130 or customer device 120, for example, "no results were found" (step 445).

Distribution module 260 processes results if there are number of results greater than a predetermined threshold (decision step 440 "YES" branch). Distribution module 260 selects a predetermined number of results with the top scores to use as output from the results received by distribution module 260 (step 450).

Distribution module 260 generates a graphical output of the received results of the application query (step 455). Distribution module 260 generates a product relationship graph with nodes and connecting directed edges. Each node represents a product and matching product are connected with an edge. The size of the edge denoted the equivalence using the score or matching criteria of each matching product respectively. The graphical output is sent to seller device 130, customer device 120, or stored in a data file stored in memory on ontology server 110.

Although, in the description above, various devices receive programming instructions or predetermined values from a user or developer, this is only meant to represent an example. Programming instructions and related data may also be generated by a computing device such that the programming instructions are received and execute on a computing device within distributed data processing environment 100 (FIG. 1).

Figure 5:
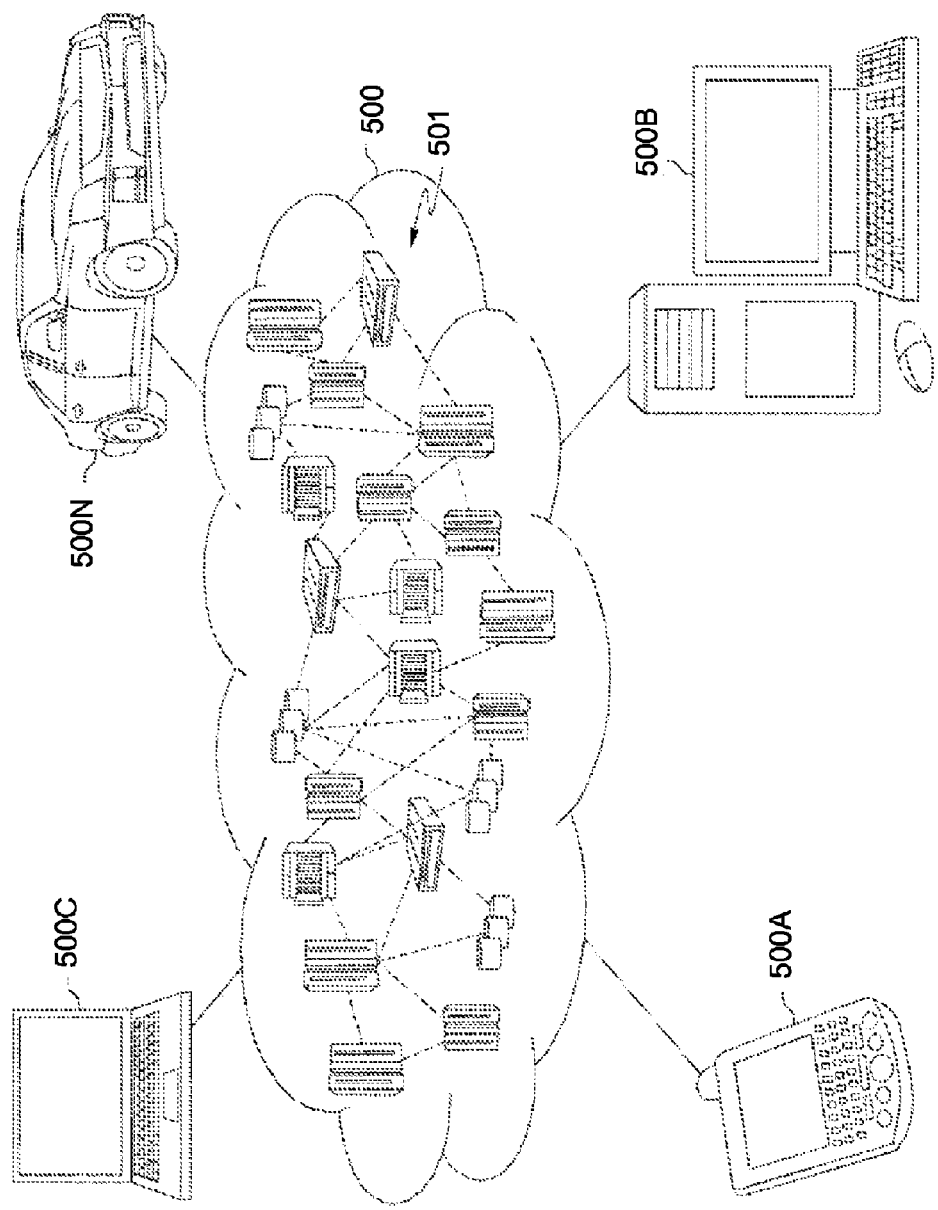
FIG. 5 is a schematic block diagram of an illustrative cloud computing environment, according to an aspect of the present invention.

Referring now to FIG. 5, an illustrative cloud computing environment 500 is depicted. As shown, the cloud computing environment 500 comprises one or more cloud computing nodes, each of which may be a distributed data processing environment 100 (FIG. 1) with which local computing devices used by cloud consumers, such as, for example, or a cellular telephone 500A, a desktop computer 500B, a laptop computer 500C, and/or an automobile computer system 500N, may communicate. The nodes 501 may communicate with one another. They may be grouped (not shown) physically or virtually, in one or more networks, such as Private, Community, Public, or Hybrid clouds as described hereinabove, or a combination thereof. This allows the cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that the computing nodes 501 and the cloud computing environment 500 can communicate with any type of computerized device over any type of network and/or network addressable connection (e.g., using a web browser).

Figure 6:
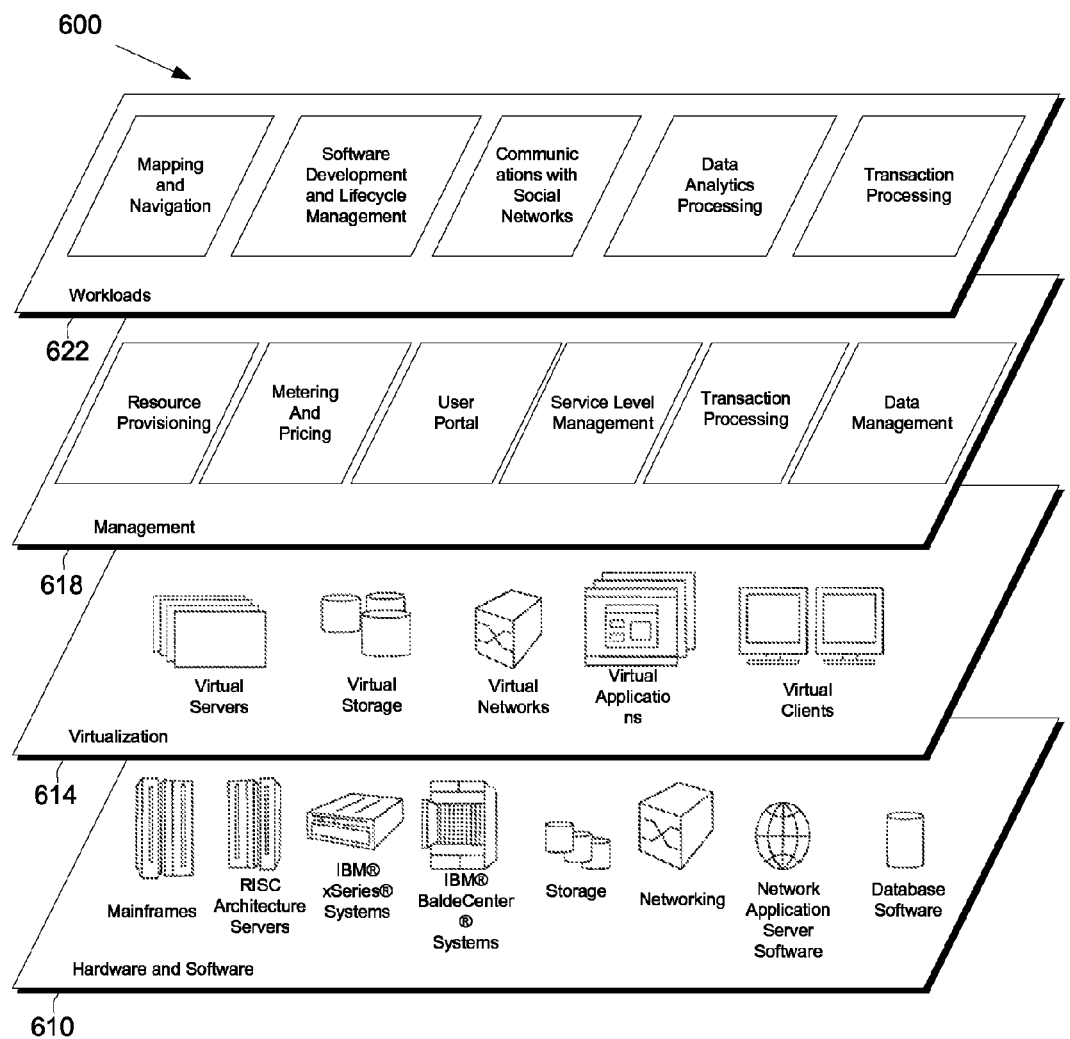
FIG. 6 is a multi-layered functional illustration of the cloud computing environment of FIG. 5, according to an embodiment of the present invention.

Referring now to FIG. 6, a set of functional abstraction layers 600 provided by the cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 610 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 614 provides an abstraction layer from which the following examples of virtual entities may be provided: virtual servers; virtual storage; virtual networks, including virtual private networks; virtual applications and operating systems; and virtual clients.

In one example, the management layer 618 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 622 provides examples of functionality for which the cloud computing environment 500 (FIG. 5) may be utilized. Examples of workloads and functions which may be provided from this layer include: mapping and navigation; software development and lifecycle management; communications with social networks; data analytics processing; and transaction processing.

Figure 7:
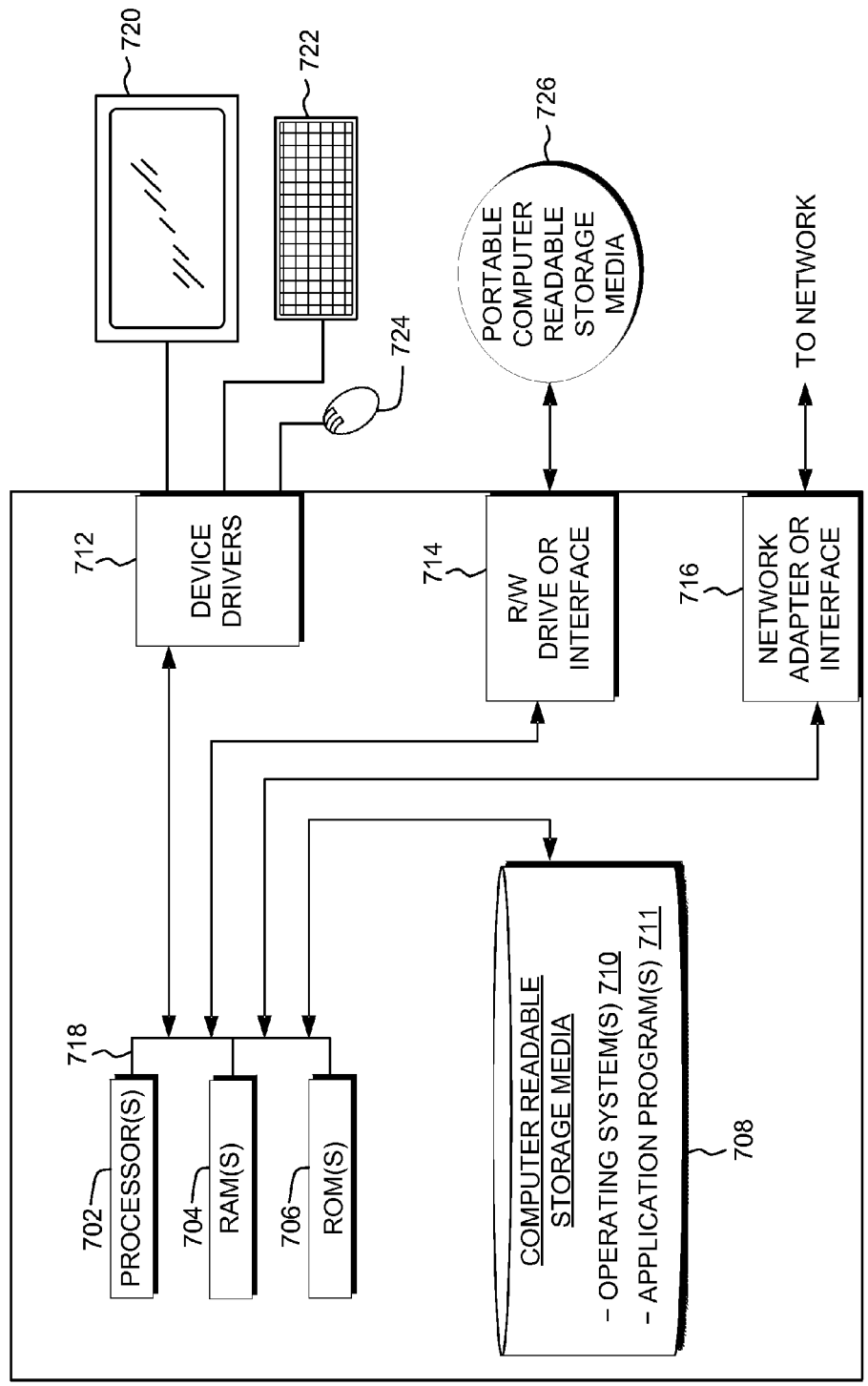
FIG. 7 depicts a block diagram of components of a computing device, in accordance with an embodiment of the present invention.

FIG. 7 depicts a block diagram of components of ontology server 110, seller device 130, and customer device 120 of distributed data processing environment 100, of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Ontology server 110, seller device 130, and customer device 120 may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, ontology application 111, server application 112, seller application 131 or customer application 121, are stored on one or more of the computer readable storage media 708 for execution by one or more of the processors 702 via one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Ontology server 110, seller device 130, and customer device 120 may also include a R/W drive or interface 714 to read from and write to one or more portable computer readable storage media 726. Application programs 711 on ontology server 110, seller device 130, or customer device 120 may be stored on one or more of the portable computer readable storage media 726, read via the respective R/W drive or interface 714 and loaded into the respective computer readable storage media 708.

Ontology server 110, seller device 130, and customer device 120 may also include a network adapter or interface 716, such as a TCP/IP adapter card or wireless communication adapter (such as a 4G wireless communication adapter using OFDMA technology). Application programs 711 on ontology server 110, seller device 130, or customer device 120 may be downloaded to the computing device from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Ontology server 110, seller device 130, and customer device 120 may also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for identifying a product relative to a reference product, comprising:
   receiving a product query from a user via a user device, the user device being capable of communicating user input and a geographical location associated with the user;
   identifying a reference product based on the received product query;
   parsing the received product query into one or more elements, wherein the one or more elements of the product query are associated with the identified reference product;
   generating an application query based on the parsed product query, wherein the application query includes a plurality of terms, the plurality of terms include at least a first term based on a predefined ontology associated with the reference product, a second term based on the one or more elements of the product query, and a third term based on one or more social media posts associated with the user, wherein the one or more social media posts includes the geographical location associated with the user;
   in response to determining the one or more social media posts associated with the user contains social media data associated with the reference product, forming a query phrase based on the plurality of terms of the application query;
   identifying a set of relevant products in a computer database based on the query phrase, wherein the identified relevant products have one or more terms that match the one or more terms of the plurality of terms of the application query, wherein the one or more terms that match includes at least the third term of the plurality of terms, wherein identifying a set of relevant products based on the query phrase and the one or more social media posts that include the geographical location increases the efficiency of identifying the set of relevant products;
   calculating a relationship score between the reference product and one or more identified relevant products of the set of identified relevant products based at least in part on the one or more matching terms;
   generating a set of scored identified relevant products for display via the user device, in response to the received product query, wherein the scored identified relevant products comprise the one or more identified relevant products with an associated relationship score above a threshold;
   receiving a user input selection, via the user device, of one or more of scored identified relevant products of the set of scored identified relevant products;
   modifying the associated relationship score of the one or more scored identified relevant products based on the received user input selection and the geographical location associated with the user; and
   generating a subset of scored identified relevant products for display via the user device, in response to the received query, based on the modified associated relationship score.

2. The method of claim 1, wherein the query phrase further comprises of:
   at least one term based on an ontology of the reference product; and
   at least one term appearing in a title of the reference product.

3. The method of claim 2 wherein the relationship score is based at least in part on a degree that the one or more terms of the identified product match the one or more terms of the query phrase.

4. The method of claim 1, wherein the social media data associated with the reference product includes one or more of:
   an electronic comment associated with the reference product;
   an electronic review record of the reference product;
   an electronic rating record of the reference product;
   an electronic description record of the reference product; and
   a social media posting associated with the reference product.

5. The method of claim 1 further comprising:
   receiving a subscription request, wherein the subscription request includes an identification;
   generating a profile associated with the identification;
   filtering a subset of the identified products based on the profile; and
   communicating a subset of filtered identified products to a recipient.

6. The method of claim 1, wherein identifying a reference product comprises one or more of:
   receiving a product query and identifying the reference product based on the product query; and
   receiving a product selection identifying the reference product.

7. A computer program product for identifying a matching product relative to a reference product, the computer program product comprising:
   one or more computer-readable storage media and program instructions stored on the one or more computer-readable storage media, the program instructions comprising:
   program instructions to receive a product query from a user via a user device, the user device being capable of communicating user input and a geographical location associated with the user;
   program instructions to identifying a reference product based on the received product query;
   program instructions to parse the received product query into one or more elements, wherein the one or more elements of the product query are associated with the identified reference product;
   program instructions to generate an application query based on the parsed product query, wherein the application query includes a plurality of terms, the plurality of terms include at least a first term based on a predefined ontology associated with the reference product, a second term based on the one or more elements of the product query, and a third term based on one or more social media posts associated with the user, wherein the one or more social media posts includes a geographical location associated with the user;

in response to program instructions to determine the one or more social media posts associated with the user contains social media data associated with the reference product, program instructions to form a query phrase based on the plurality of terms of the application query;

program instructions to identify a set of relevant products in a computer database based on the query phrase, wherein the identified relevant products have one or more terms that match the one or more terms of the plurality of terms of the application query, wherein the one or more terms that match includes at least the third term of the plurality of terms, wherein identifying a set of relevant products based on the query phrase and the one or more social media posts that include the geographical location increases the efficiency of identifying the set of relevant products;

program instructions to calculate a relationship score between the reference product and one or more identified relevant products of the set of identified relevant products based at least in part on the one or more matching terms;

program instructions to generate a set of scored identified relevant products for display via the user device, in response to the received product query, wherein the scored identified relevant products comprise the one or more identified relevant products with an associated relationship score above a threshold;

program instructions to receive a user input selection, via the user device, of one or more of scored identified relevant products of the set of scored identified relevant products;

program instructions to modify the associated relationship score of the one or more scored identified relevant products based on the received user input selection and the geographical location associated with the user; and program instructions to generate a subset of scored identified relevant products for display via the user device, in response to the received query, based on the modified associated relationship score.

8. The computer program product in accordance with claim 7, wherein the query phrase further comprises of:
   at least one term based on an ontology of the reference product; and
   at least one term appearing in a title of the reference product.

9. The computer program product in accordance with claim 7, wherein data associated with the reference product includes one or more of:
   an electronic comment associated with the reference product;
   an electronic review record of the reference product;
   an electronic rating record of the reference product;
   an electronic description record of the reference product; and
   a social media posting associated with the reference product.

10. The computer program product in accordance with claim 7 wherein the relationship score is based at least in part on the degree that the one or more terms of the identified product match the one or more terms of the query phrase.

11. The computer program product in accordance with claim 7 further comprising:

program instructions to receive a subscription request, wherein the subscription request includes an identification;
program instructions to generate a profile associated with the identification;
program instructions to filter a subset of the identified products based on the profile; and
program instructions to communicate a subset of filtered identified products.

12. The computer program product in accordance with claim 7, wherein the program instructions to identify a reference product comprises one or more of:
   program instructions to receive a product query and identify the reference product based on the product query; and
   program instructions to receive a product selection identifying the reference product.

13. A computer system for identifying a matching product relative to a reference product, the computer system comprising:
   one or more computer processors;
   one or more computer readable storage media;
   program instructions stored on the computer-readable storage media for execution by at least one of the one or more processors, the program instructions comprising:
   program instructions to receive a product query from a user via a user device, the user device being capable of communicating user input and a geographical location associated with the user;
   program instructions to identifying a reference product based on the received product query;
   program instructions to parse the received product query into one or more elements, wherein the one or more elements of the product query are associated with the identified reference product;
   program instructions to generate an application query based on the parsed product query, wherein the application query includes a plurality of terms, the plurality of terms include at least a first term based on a predefined ontology associated with the reference product, a second term based on the one or more elements of the product query, and a third term based on one or more social media posts associated with the user, wherein the one or more social media posts includes a geographical location associated with the user;
   in response to program instructions to determine the one or more social media posts associated with the user contains social media data associated with the reference product, program instructions to form a query phrase based on the plurality of terms of the application query;
   program instructions to identify a set of relevant products in a computer database based on the query phrase, wherein the identified relevant products have one or more terms that match the one or more terms of the plurality of terms of the application query, wherein the one or more terms that match includes at least the third term of the plurality of terms, wherein identifying a set of relevant products based on the query phrase and the one or more social media posts that include the geographical location increases the efficiency of identifying the set of relevant products;
   program instructions to calculate a relationship score between the reference product and one or more identified relevant products of the set of identified relevant products based at least in part on the one or more matching terms;

program instructions to generate a set of scored identified relevant products for display via the user device, in response to the received product query, wherein the scored identified relevant products comprise the one or more identified relevant products with an associated relationship score above a threshold;

program instructions to receive a user input selection, via the user device, of one or more of scored identified relevant products of the set of scored identified relevant products;

program instructions to modify the associated relationship score of the one or more scored identified relevant products based on the received user input selection and the geographical location associated with the user; and program instructions to generate a subset of scored identified relevant products for display via the user device, in response to the received query, based on the modified associated relationship score.

14. The system in accordance with claim 13, wherein the query phrase further comprises of:
   at least one term based on an ontology of the reference product; and
   at least one term appearing in a title of the reference product.

15. The system in accordance with claim 14, wherein data associated with the reference product includes one or more of:
   an electronic comment associated with the reference product;
   an electronic review record of the reference product;
   an electronic rating record of the reference product;
   an electronic description record of the reference product; and
   a social media posting associated with the reference product.

16. The system in accordance with claim 13 further comprising:
   program instructions to receive a subscription request, wherein the subscription request includes an identification;
   program instructions to generate a profile associated with the identification;
   program instructions to filter a subset of the identified products based on the profile; and
   program instructions to communicate a subset of filtered identified products.

17. The system in accordance with claim 13, wherein identifying a reference product comprises one or more of:
   program instructions to receive a product query and identifying the reference product based on the product query; and
   program instructions to receive a product selection identifying the reference product.

* * * * *